Feb. 18, 1969  L. D. ELY  3,428,460
CONTAINER TYPE STIRRER
Filed Aug. 5, 1965
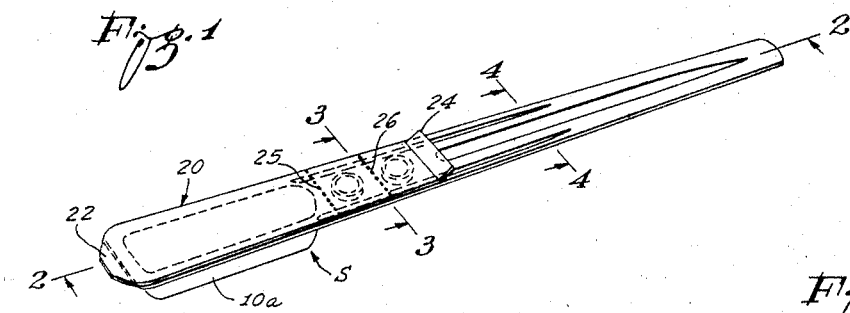
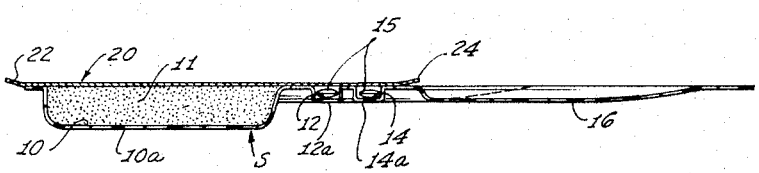
 
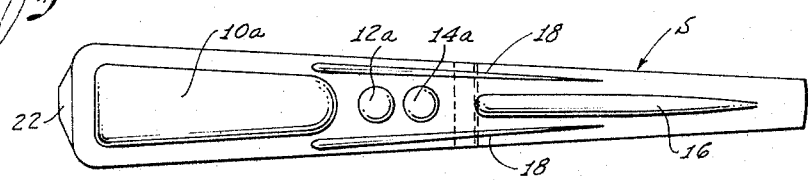
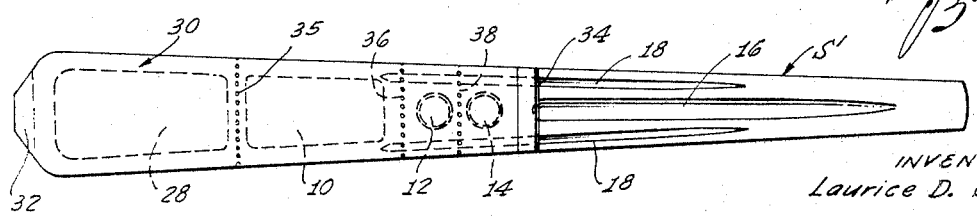
INVENTOR:
Laurice D. Ely
Attorneys

United States Patent Office 3,428,460
Patented Feb. 18, 1969

3,428,460
CONTAINER TYPE STIRRER
Laurice D. Ely, 835 S. Wellesley,
Los Angeles, Calif. 90049
Filed Aug. 5, 1965, Ser. No. 477,450
U.S. Cl. 99—77.1     6 Claims
Int. Cl. A23f; B65b 29/06

ABSTRACT OF THE DISCLOSURE

A container adapted for stirring a beverage including an elongated member defining cavities containing beverage additives. The cavities are closed by a cover strip allowing selective mixing of an additive with the beverage.

---

This invention relates to the combination in one item of a stirring instrument and a package for dry concentrated material for use in beverages and the like and, more particularly, relates to a disposable stirring spoon having a plurality of compartments containing various dry ingredients and adapted to be opened selectively for release of the ingredients.

The embodiment of the invention that meets the widest demand, is a disposable multiple-compartment spoon for use by coffee drinkers with a moistureproof and heat-resistant pressure-sensitive strip or tape releasable closing the compartments in a manner that permits the compartments to be opened selectively. In one practice of the invention the multiple compartments comprise a linear arrangement of a relatively large compartment for a dry creaming agent and two relatively small compartments each containing a sweetener. The whole tape may be peeled away to release the creaming agent and the maximum quantity of sweetener; less of the tape may be peeled away to reduce the sweetener by half; one end portion only of the tape may be peeled away to release the creaming agent alone; or the opposite end portion of the tape may be peeled away to release the sweetener alone either from a single compartment or from both of the two small compartments.

Such a device combining a stirrer and a multiple compartment container has special utility for serving coffee to a group of people. The device affords completely sanitary packaging, makes unnecessary conventional containers for cream and sugar, and eliminates the waste and spoilage that is unavoidable in the employment of such bulk containers. Of special importance in industrial use for coffee breaks is the fact that no time is lost in a line at the coffee dispenser because there are no pauses in the line at the cream and sugar containers.

In a second practice of the invention, the stirrer has a compartment for powdered coffee, tea or cocoa in addition to the usual compartment for a creaming agent and the two small compartments for a sweetener. Such a device requires only the availability of hot water to make a beverage and is especially useful for camping and picnicing.

In the initial practice of the invention the stirrer comprises a plastic member or shell with a large cavity for a creaming agent at the leading end of the stirrer and two smaller cavities for sweetening tablets spaced longitudinally of the stirrer from the large cavity. A suitable length of tape is releasably bonded to the plastic shell to cover the cavities to form therewith the required closed compartments for the various ingredients. This tape may be readily peeled away to any desired extent and yet is capable of sustained sealing effectiveness to keep a selected compartment closed when the stirrer is immersed in boiling water.

Preferably the tape has short free end portions at both ends to serve as tabs or finger pieces for peeling away the tape from either end and preferably the tape is also perforated or otherwise weakened along transverse lines between the successive compartments. Such an arrangement permits uncovering the cavities from either end of the tape and where only a portion of the tape is peeled away, the peeled away portion may be readily severed along a weakened transverse line.

The features and advantages of the invention may be understood from the following detailed description and the accompanying drawing.

In the drawing, which is to be regarded as merely illustrative:

FIG. 1 is a perspective view of an embodiment of the invention that provides a relatively large compartment for a creaming agent and two smaller compartments for sweetener tablets;

FIG. 2 is a longitudinal section taken as indicated by the line 2—2 of FIG. 1;

FIG. 3 is a transverse section on a larger scale taken along the line 3—3 of FIG. 1;

FIG. 4 is a transverse section on the enlarged scale taken along the line 4—4 of FIG. 1;

FIG. 5 is a bottom plan view of the same embodiment of the invention; and

FIG. 6 is a bottom paln view of a second embodiment of the invention which contains powdered coffee, tea or cocoa in addition to the creaming agent and the two sweetener tablets.

In the first embodiment of the invention shown in FIGS. 1–5 of the drawing, a thin-walled plastic shell, generally designated S is of an elongated configuration to serve as means to stir a hot beverage such as coffee, tea or cocoa in a cup and is formed with a series of cavities distributed longitudinally of the shell. In this embodiment of the invention, the cavities comprising a relatively large elongated cavity 10 having a wall 10a is intended to hold a powdered creaming agent 11 of a suitably commercially available type and two relatively small cavities 12 and 14 having walls 12a and 14a respectively, each dimensioned to hold an artificial low caloric sweetener in the form of a tablet 15.

Preferably the shell S is relatively thin to make the device light in weight and to economize on the plastic material, and the thin walled shell is suitably reinforced by embossed ribs. In the construction shown, a central rib 16 extends from the region of the two cavities 12 and 14 towards the handle end of the shell and a pair of ribs 18 straddle both the two small cavities and the central rib, the three ribs tapering in plan towards the handle end of the shell as shown.

The three cavities 10, 12 and 14 are releasably closed by a strip or tape 20 of thin sheet material which is adapted to be peeled away from the cavities selectively. In the construction shown, a single tape 20 of the thin sheet material covers the three cavities and the tape has free end portions 22 and 24 at its opposite ends respectively which are not bonded to the shell and which serve as finger pieces or handles for progressively peeling away the strip to any desired extent.

It is contemplated that whenever only a portion of the tape 20 is peeled away, the peeled portion will be torn away and discarded. To facilitate discarding peeled portions of the tape 20, the tape may be weakened along transverse lines between successive cavities. For this purpose, a line 25 of short cuts or perforations may extend across the tape between the large cavity 10 and the next cavity 12 and a second similar line 26 of short cuts or perforations may extend transversely of the tape between the two small cavities 12 and 14. Thus the strip or tape 20 cooperates with the three cavities to provide three normally closed compartments for the dry materials.

If desired, the device may be used solely as a stirrer without releasing any of the dry materials. If only the powdered creaming agent is to be released into a hot beverage, the end portion 22 of the strip 20 is grasped between the fingers to peel the strip back to the transverse line 25 and the tape is pulled apart along the line to release the peeled portion of the tape for discarding. Then the shell with the confined tablets 15 is employed to stir the creaming agent into the hot beverage.

If it is desired to release the powdered creaming agent along with only one of the two tablets 15, the manual peeling by means of the end portion 22 may be extended to the second transverse line 26, the peeled portion of the tab then being torn away and discarded. The shell with the single remaining tablet sealed therein is employed to stir the released powdered creaming agent and the released sweetener into the hot beverage. If the powdered creaming agent together with both the sweetener tablets 15 is to be released, the whole tape may be peeled away by grasping either of the two end portions 22 and 24.

It is also apparent that if it is desirable to release a single sweetener tablet without releasing the creaming agent, the end portion 24 of the tape may be grasped to peel the tape back to the line 26, the peeled portion then being torn away and discarded. Or if it is desirable to release both of the sweeteners without releasing the creaming agent, the peeling action by means of the end portion 24 may be continued to the second line 25.

It will be readily appreciated that the plastic employed for the shell S must be of suitable strength and must be resistant to hot water. For this purpose the plastic shell may be made of polyethylene or styrene, high impact polyethylene being preferred. Such a plastic shell may be economically mass produced by a vacuum forming technique.

It is also apparent that the tape 20 must be moisture proof; that the tape must be immune to the effects of boiling water; that the adhesive for the tape must maintain its bonding effectiveness when subjected to boiling water; and that neither the tape nor the adhesive employed for bonding the tape must release any toxic material when immersed in boiling water. For example, a suitable tape for this purpose is 3–M Scotch Pressure-Sensitive White Opaque Label Stock No. 7600. This tape may be peeled away in any desired extent, may be readily torn off and any portion of the tape that is retained across a cavity will keep the cavity sealed off even when the stirrer is immersed for an extended period of time in a hot beverage.

In the second embodiment of the invention shown in FIG. 6, the construction is largely similar to the first embodiment as indicated by the use of corresponding numerals to indicate corresponding parts. This second embodiment of the invention is intended to not only provide a dry creaming agent and a dry sweetener, but also to provide a powdered beverage in the form of powdered instant coffee, powdered instant tea or powdered cocoa. For this purpose the elongated plastic shell S' is formed with an additional large cavity 28 for the powdered beverage material.

A strip or tape 30 of the previously described material covers the four cavities 28, 10, 12 and 14, and in the previously described manner is provided with opposite end portions 32 and 34 which may be employed selectively to peel away all of the tape or any portion of the tape. The tape is weakened in the previously described manner along three transverse lines, namely, a transverse line 35 between the cavity 28 and the cavity 10, a transverse line 36 between the cavity 10 and the cavity 12 and a transverse line 38 between the cavity 12 and the cavity 14.

It is apparent that the end portion 32 may be manipulated to peel the tape sufficiently to release the powdered beverage from the cavity 28 or may be peeled further to release not only the powdered beverage from the cavity 28 but also the creaming agent from the cavity 10, or may be peeled away still further to release additionally a sweetening tablet 15 from the cavity 12. If only the powdered beverage is released, the peeled tape is torn along the line 35; if only the powdered beverage and the creaming agent are released, the peeled tape is severed along the line 36 and if the powdered beverage together with the creaming agent and one sweetener tablet is released the peeled tape is torn along the line 38. If all four cavities are to be opened the whole tape may be peeled away from either end.

If the powdered beverage and only one sweetener tablet are to be released, the finger piece or tab 32 is grasped to peel the tape up to the line 35, the peeled portion being discarded and the other end of the tape is peeled by means of the tab or end portion 34 up to the line 38, the second peeled portion being discarded. If the powdered beverage and the two sweetener tablets are to be released, but the creaming agent is to be withheld, the end portion or tab 32 is grasped to remove the tape up to the line 35 and the second end portion 34 is grasped to remove the tape up to the line 36.

My description in specific detail of the selected embodiments of the invention will suggest various changes, substitutions and other departures from my disclosure within the spirit and scope of the appended claims. For example, the invention may be readily adapted for containing other dry food materials to be employed in a hot liquid. Thus in an embodiment of the invention such as the first embodiment shown in FIGS. 1 to 5 a relatively large compartment may be used for dehydrated soup and the two smaller compartments may be used for example to contain salt and powdered garlic respectively. Another embodiment may have one or more cavities for medication. For example, a cavity may contain an effervescent painkiller.

I claim:

1. A device for use with a hot beverage such as coffee or tea, comprising:

an elongated member of a length to serve as manual means to stir the beverage, said member having a plurality of cavities arranged longitudinally thereof including a relatively large cavity containing a dry creaming agent and at least one relatively small cavity containing a dry sweetener;

a strip of sheet material extending over and sealing the cavities, the strip being manually removable by peeling action, one end of the strip covering the relatively large cavity, the other end of the strip covering the relatively small cavity, said strip being weakened along a transverse line between the cavities whereby the two ends of the strip may be peeled away selectively to expose selectively the relatively large cavity or the relatively small cavity, said strip being resistant to boiling water to protect a dry material confined in a cavity by the strip when the device is employed to stir the hot beverage.

2. A device as set forth in claim 1 which includes two relatively small cavities spaced longitudinally of the elongated member, each containing a dry sweetener, whereby one of the relatively small cavities may be opened to release a relatively small amount of sweetener or both of the relatively small cavities may be opened to release twice the amount of sweetener.

3. A device as set forth in claim 2 which includes a second relatively large cavity spaced longitudinally of the elongated member from the first mentioned cavity, said second large cavity containing a dehydrated beverage for addition to hot water.

4. In a device for use with a beverage comprising:

an elongated member of a configuration to serve as a stirrer for a beverage, the elongated member forming a plurality of cavities distributed longitudinally thereof;

edible ingredients including at least two different ingredients in the cavities, respectively, to be added to the beverage selectively; and a single at least substantially continuous cover strip extended longitudinally of the elongated member and covering the cavities to confine the edible ingredients therein with said cover strip having free portions at the opposite ends thereof to serve as finger pieces for peeling away such opposite ends, said strip being weakened along transverse lines between successive cavities to permit a peeled portion of the strip to be discarded before a stirring operation, said strip being resistant to a hot liquid to protect the edible ingredients within said cavities when the device is used to stir a hot beverage.

5. A stirring device for a beverage comprising:

an elongated member of a length to serve as manual means to stir the beverage, said elongated member adjacent one end thereof defining a relatively large cavity for containing a beverage additive and the other end of said member defining a handle for said elongated member, said elongated member intermediate said handle and said relatively large cavity defining a relatively small cavity for containing a beverage additive;

a strip of sheet material extending over and sealing the cavities, the strip being manually removable by a peeling action, one end of the strip covering the relatively large cavity and the other end of the strip covering the relatively small cavity whereby the two ends of the strip may be peeled away selectively to expose selectively the beverage additive in the relatively large cavity or in the relatively small cavity; and said strip being resistant to a hot liquid to protect the beverage additive confined within said cavity by the strip when the device is employed to stir a hot beverage.

6. A stirring device as defined in claim 5 wherein said elongated member is in the form of an integral plastic shell having at least one longitudinally extending reinforcing rib.

References Cited

UNITED STATES PATENTS

| | | | |
|---|---|---|---|
| 2,791,324 | 5/1957 | Knoop et al. | 99—171 X |
| 3,154,418 | 10/1964 | Lovell et al. | 99—77.1 |
| 3,185,578 | 5/1965 | Scharre | 99—171 |
| 3,275,448 | 9/1966 | Sommer | 99—77.1 |

A. LOUIS MONACELL, *Primary Examiner.*

S. B. DAVIS, *Assistant Examiner.*

U.S. Cl. X.R.

99—171